H. L. WHITLEY.
CRANK SHAFT ADJUSTING MEANS.
APPLICATION FILED JULY 7, 1921.
1,427,043.
Patented Aug. 22, 1922.
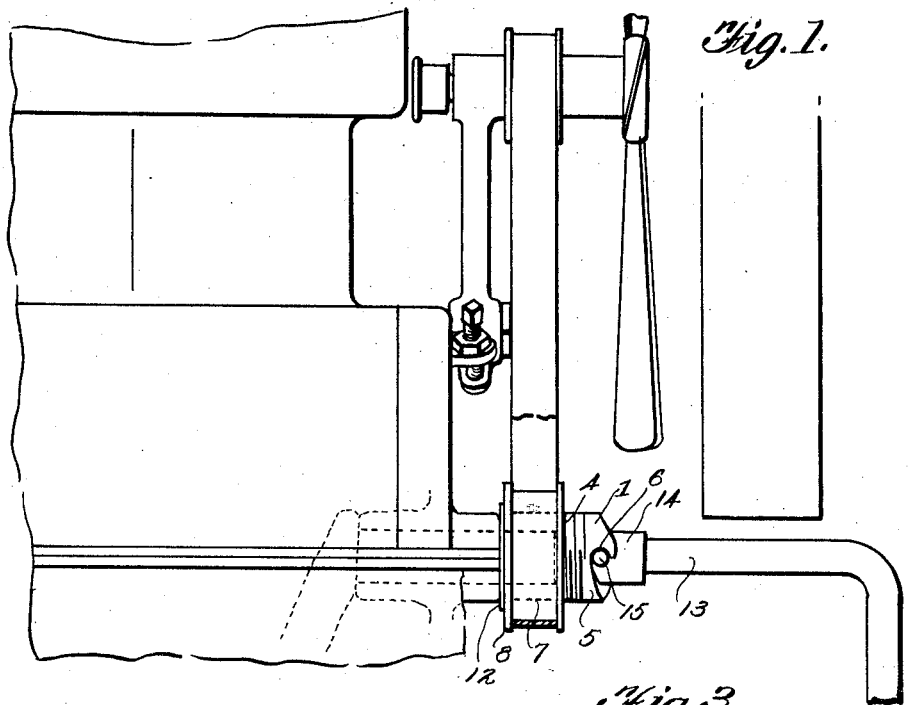
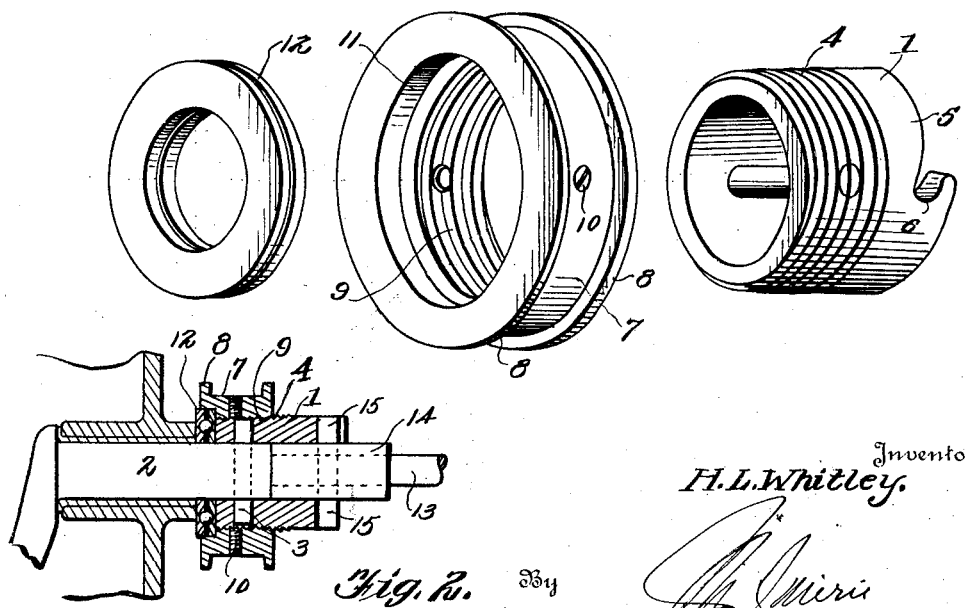

UNITED STATES PATENT OFFICE.

HOWZE L. WHITLEY, OF BRYAN, TEXAS.

CRANK-SHAFT-ADJUSTING MEANS.

1,427,043.    Specification of Letters Patent.    Patented Aug. 22, 1922.

Application filed July 7, 1921.  Serial No. 483,041.

*To all whom it may concern:*

Be it known that I, HOWZE L. WHITLEY, a citizen of the United States of America, residing at Bryan, in the county of Brazos and State of Texas, have invented certain new and useful Improvements in Crank-Shaft-Adjusting Means, of which the following is a specification.

This invention relates to a crank shaft adjusting means, designed particularly for use in connection with Ford automobiles and the like, and adapted when in place to provide a simple adjustment by which end play in the crank shaft may be corrected and eliminated, in order that the connecting rods may be held in proper alignment and excess end wear on bearings and bushings prevented.

The construction as a whole is capable of ready and easy installation on a Ford automobile by removing the fan pulley and usual crank ratchet, and when in place, the simple manual adjustment or turning of the fan pulley compels an endwise movement of the crank shaft to thereby take up the play and prevent undue wear.

In the drawings:

Fig. 1 is a view in elevation showing sufficient of a Ford motor to illustrate the application of the improvement.

Fig. 2 is an enlarged vertical sectional view, showing the improved adjusting means in applied position.

Fig. 3 is a perspective view of the various parts of the improvement shown separated.

The improved construction comprises a sleeve-like element 1, adapted to be secured to the end of the crank shaft 2 by a pin 3. This sleeve-like element is secured to the crank shaft in place of the present fan pulley, the hole in the crank shaft for the fan pulley pin being utilized with this sleeve, and the connection is identical except that the pin is of less length. The exterior of this sleeve is threaded at 4, and its forward edge is formed with the usual opposed inclined walls 5, terminating in notches 6, for connection with the crank handle.

The fan pulley proper 7 is of the usual type, except that preferably it is provided with edge flanges 8 to prevent the fan belt from running off the pulley. This pulley is interiorly threaded at 9 to cooperate with the threads 4 of the sleeve 1, set screws 10 being provided in the pulley proper for securing the pulley in rigid connection with the sleeve when desired.

That end of the pulley next the engine proper is recessed at 11 to receive a thrust washer 12, the forward edge of the thrust washer resting thus against the rear end of the sleeve 1.

The crank handle is provided as usual with the stem 13 extending through the bushing below the radiator, the inner end of the handle having a sleeve enlargement 14 provided with pin or lug extensions 15 to cooperate with the walls 5 and notches 6 in cranking the engine.

In applied position, it will be noted that the thrust washer overlies that portion of the engine surrounding the crank shaft, bearing on this engine portion, usually the gear case, as a fixture. When it is desired to adjust the crank shaft to take up the end play, the set screws 10 are loosened and the fan pulley 7 turned by hand. This causes the fan pulley to move longitudinally with respect to the sleeve element 1, owing to the threaded connection at 4 and 9, with the result that the thrust washer 12 carried by the fan pulley exerts a pressure on the engine as a fixture or base, and thus compels a longitudinal movement of the crank shaft. The set screws 10 are then tightened, and the fan pulley driven in the usual manner by the crank shaft.

Obviously, the improvement eliminates and corrects end play in the crank shaft to thus hold the connecting rods in proper alignment and prevent excess end wear on bearings and bushings. Furthermore, by this adjustment, the proper air gap may be secured between the coils and magnets in the fly wheel. It is apparent that through the means provided the most advantageous adjustment of the crank shaft can be obtained by simply turning the fan pulley in the desired direction. The parts shown are designed particularly for use on Ford automobiles, and may obviously be applied as substitutes for the parts now used without the necessity of machine work, or change of any kind.

Claims:

1. A crank shaft adjusting means, comprising an element secured to the shaft and exteriorly threaded, a fan pulley threaded upon said element, and a thrust washer carried by the fan pulley to engage an adjacent part of the engine in the adjustment of the fan pulley on said element.

2. A crank shaft adjusting means, comprising a sleeve-like element secured to the shaft and exteriorly threaded, the forward end of said element being formed to receive a hand cranking member, a fan belt pulley threaded upon said element, and a thrust washer loosely carried by the pulley and adapted to engage an adjacent part of the engine.

3. A crank shaft adjusting means, comprising an element secured to the shaft and exteriorly threaded, a fan pulley threaded upon said element, means for securing said pulley in fixed relation to the element when desired, and a thrust washer carried by the fan pulley to engage an adjacent part of the engine in the adjustment of the fan pulley on said element.

4. A crank shaft adjusting means, comprising an exteriorly threaded sleeve-like element encircling the end of the crank shaft, a pin removably connecting said parts, a fan belt pulley encircling and having threaded connection with said element, and a thrust washer seated in a recess formed in said pulley and adapted to engage a part of the engine as a fixture.

In testimony whereof I affix my signature.

HOWZE L. WHITLEY.